No. 874,138. PATENTED DEC. 17, 1907.
M. J. TRETT.
KETTLE LID.
APPLICATION FILED MAY 6, 1907.
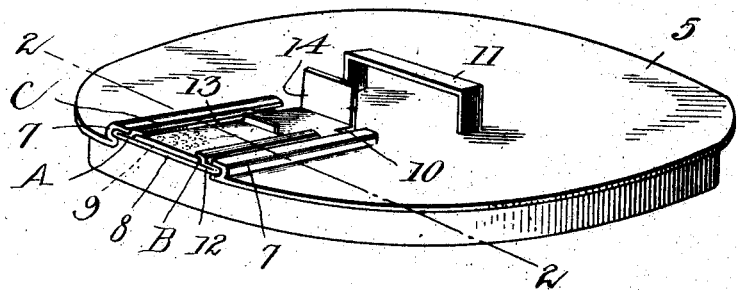
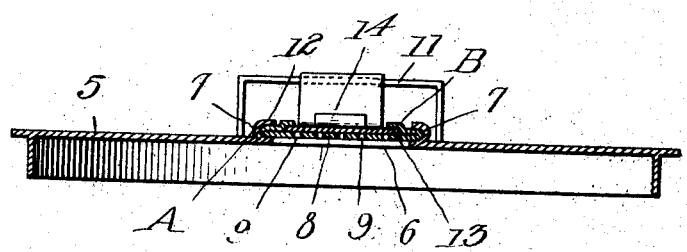
WITNESSES:
INVENTOR
Minnie J. Trett
By Woodward & Chandler
Attorney

20# UNITED STATES PATENT OFFICE.

MINNIE JANE TRETT, OF ARKANSAS CITY, ARKANSAS.

KETTLE-LID.

No. 874,138.　　　Specification of Letters Patent.　　　Patented Dec. 17, 1907.

Application filed May 6, 1907. Serial No. 372,053.

*To all whom it may concern:*

Be it known that MINNIE JANE TRETT, citizen of the United States, residing at Arkansas City, in the county of Desha and State of Arkansas, has invented certain new and useful Improvements in Kettle-Lids, of which the following is a specification.

This invention relates to cooking utensils, and more particularly to lids therefor, and has for its object to provide a kettle lid having a drain opening and a slide movable into and out of position to cover the opening to prevent the passage of matter of certain character therethrough.

Another object is to provide a lid of this kind, including also a handle located to limit the movement of the above mentioned slide.

Other objects and advantages will be apparent from the following description, and it will be understood that changes in the specific structure shown and described may be made within the scope of the claims, without departing from the spirit of the invention.

In the drawings forming a portion of this specification, and in which like numerals of reference indicate similar parts in the several views, Figure 1. is a perspective view of the present lid, Fig. 2. is a transverse section on line 2—2 of Fig. 1.

Referring now to the drawings, there is shown a circular lid 5, having a drain opening 6 therein adjacent to and opening through its periphery. At opposite sides of this opening, the metal of the lid is bent upwardly to form guides 7, which are parallel, as shown, and slidably engaged in these guides, there is a metallic plate 8, having a plurality of perforations 9 therein, at its outer end.

The plate 8 is transversely reduced at its inner portion, and this reduced portion is turned upwardly as shown at 10, to form a finger piece, by which the slide may be moved. Secured to the lid 5 centrally thereof and opposite to the inner end of the slide 8, there is a handle 11, which is thus located in the path of movement of the slide, and in position to receive the latter thereagainst and limit the movement thereof, to prevent its disengagement from the guide.

It will be seen that the handle 11 is so located that the thumb of the user may be placed thereagainst, while the fingers engage the finger piece 10, to move the slide.

Mounted upon the slide 8, there are a pair of parallel guides 12, formed by bending the edge portions of the slide inwardly upon itself, as shown at A, then upwardly as shown at B, and then inwardly as shown at C, the guides being thus located inwardly of the guides 7. A supplemental plate 13 is slidably engaged in the guides 12, for movement into and out of position to cover the perforations 9, and the plate 13 is also provided with a reduced upwardly turned inner end portion forming a finger piece 14.

In use, when cooking potatoes or other large articles, and it is desired to drain the kettle, the slide 8 may be moved into inoperative position, and the liquid poured off through the opening 6. When cooking small articles, of the size to pass through the opening 6, the slide 8 is allowed to remain in operative position and the supplemental plate 13 is slid to uncover the perforations 9 when the liquid may be poured off therethrough.

What is claimed is:

The combination with a kettle lid having an opening therein adjacent to and opening through its periphery, said lid having portions thereof at opposite sides of the opening bent to form parallel guides, of a slide movably engaged in the guides and having its side edge portions bent inwardly upon itself and then upwardly and again inwardly to form guides, said slide having perforations between the guides and having its inner end portion bent upwardly to form a finger piece, a plate engaged in the guides of the slide for movement into and out of position to cover the perforations of the slide, said plate having its inner end portion bent upwardly to form a finger piece, and a handle for the lid located to receive the finger piece of the slide thereagainst to limit the inward movement of the slide.

In testimony whereof she affixes her signature, in presence of two witnesses.

MINNIE JANE TRETT.

Witnesses:
　C. C. HAYNES,
　R. F. CLARKE.